3,741,818
METHOD OF FABRICATING A COMPOSITE SEAL HAVING A REFRACTORY OXIDE SURFACE
Alan John Surrall, Redditch, England, assignor to British Leyland Truck and Bus Division Limited, Leyland, England
No Drawing. Filed Jan. 12, 1972, Ser. No. 217,388
Claims priority, application Great Britain, Jan. 26, 1971, 3,133/71
Int. Cl. C23c 11/00
U.S. Cl. 148—6.3      3 Claims

ABSTRACT OF THE DISCLOSURE

A method of manufacturing a counterface seal for a rotary disc-type matrix of a regenerative heat-exchanger comprises: forming a composite structure, consisting of a counterface element and heat-resistant support pad, by brazing highly-compacted blocks of a high-temperature material onto the support pad; thermally converting the composite structure to produce the required composition at the working surface of the counterface element; and lapping that surface to achieve the requisite flatness.

---

This invention relates to seals for regenerative heat-exchangers of the kind employing a rotary disc-type matrix.

Regenerative heat-exchangers of the kind referred to are usually incorporated in gas turbine power plants to extract heat from the exhaust gases, and to transfer it to the compressed intake-air before this enters the combustion chamber of the gas turbine engine. The rotary disc-type matrix, which is housed in the casing of the engine, normally comprises a foraminous refractory core of ceramic or glass-ceramic material formed with a multitude of fluid-flow ducts. Sector-like zones of the core are caused (by its rotation) to be presented alternately to the flow of the exhaust gases and to the flow of the compressed intake-air. In that way the required heat transference is effected.

It is, of course, necessary to segregate the two gaseous flows at all times, and to minimize leakage between the high-pressure zones, occupied by the compressed intake-air, and the low-pressure zones occupied by the exhaust gases. The air and exhaust gas flow through the heat-exchanger disc in opposite directions such that the cold air enters the disc adjacent to the exit of the cooled exhaust gas. This face of the disc, embracing both air entry and gas exit sectors, is commonly designated the "cold side." Similarly, the hot exhaust gas enters the disc adjacent to the exit of the heated air. This face of the disc, embracing both gas entry and air exit sectors, is commonly designated the "hot side."

To effect segregation of the air and exhaust gas, it is common practice to employ counterface seals that make rubbing contact with the respective faces of the matrix, the hot-side seals being of high-temperature material.

The counterface material employed for the hot-side seals of ceramic regenerative heat-exchangers is normally nickel oxide, which is either flame-sprayed or plasma-sprayed onto the counterface support pad of the seal. The disadvantages of this method are that considerable time is required to build up an adequate deposit; the adhesion to the substrate is never as high as is desirable; and the wastage of costly material is high.

According to this invention an improved method of manufacturing a counterface seal for a rotary disc-type matrix of a regenerative heat-exchanger comprises: forming a composite structure, consisting of a counterface element and heat-resistant support pad, by brazing highly-compacted blocks of a high-temperature powder material onto the support pad; thermally converting the composite structure to produce the required composition at the working surface of the counterface element; and lapping that surface to achieve the requisite flatness.

By means of the invention, the following advantages over use of flame-spraying or plasma-spraying techniques can be achieved:

(a) An economy in the amount of material consumed is effected, due to the use of highly-compacted blocks instead of sprayed powder.

(b) The strength of the bond between the counterface element and its support pad is increased very considerably.

(c) Greater working thickness of the counterface element is possible.

(d) A higher degree of quality control is possible with this process.

The highly-compacted blocks referred to above, which can be produced in known manner, may, for example, be formed to suitable shapes from a composition of nickel metal and calcium fluoride, containing not less than 80% by weight of nickel. The blocks can have a thickness of from 0.125 inch to 0.5 inch, but 0.25 inch is a typical value.

The brazing operation can be carried out either in a vacuum or in high-purity hydrogen.

The material used for the support pad of the composite structure should possess a coefficient of thermal expansion compatible with the block material, e.g. ferritic steel or "Nimonic 75" ("Nimonic" is a trademark).

A typical example of the above-mentioned thermal conversion treatment is to heat the composite structure in air at a temperature of about 800° C. for at least two hours, to produce a layer of nickel oxide at the surface of the counterface element.

I claim:
1. A method of manufacturing a counterface seal for a rotary disc-type matrix of a regenerative heat-exchanger, which comprises: forming a composite structure, consisting of a counterface element and a heat-resistant support pad, by brazing highly-compacted blocks of a powdered refractory metal such as nickel onto the support pad; subjecting the composite structure to a high temperature in an oxidizing atmosphere in order to produce the required refractory oxide composition at the working surface of the counterface element; and lapping that surface to achieve the requisite flatness.

2. A method according to claim 1, in which the highly-compacted blocks are formed from a composition of nickel metal and calcium fluoride, containing not less than 80% by weight of nickel.

3. A method according to claim 2, in which the composite structure is heated in air at a temperature of about 800° C. for at least two hours, to produce a layer of nickel oxide at the surface of the counterface element.

References Cited

UNITED STATES PATENTS

| | | | |
|---|---|---|---|
| 2,010,145 | 8/1935 | Eitel | 287—189.365 |
| 2,555,877 | 6/1951 | Doran | 287—189.365 |
| 2,988,853 | 6/1961 | Certa | 148—6.3 X |
| 3,395,993 | 8/1968 | Bristow | 287—189.365 X |
| 3,547,673 | 12/1970 | Bredzs et al. | 29—196.6 X |

CHARLES W. LANHAM, Primary Examiner
D. C. REILEY, III, Assistant Examiner

U.S. Cl. X.R.
29—195 M, DIG. 4; 277—35 R; 287—189.365